(12) United States Patent
Wang et al.

(10) Patent No.: US 12,254,814 B2
(45) Date of Patent: Mar. 18, 2025

(54) DRIVE APPARATUS AND DISPLAY APPARATUS

(71) Applicants: Chongqing BOE Optoelectronics Technology Co., Ltd., Chongqing (CN); BOE Technology Group Co., Ltd., Beijing (CN)

(72) Inventors: Bo Wang, Beijing (CN); Kangpeng Dang, Beijing (CN); Hong Chen, Beijing (CN); Ming Gao, Beijing (CN); Xiong Guo, Beijing (CN); Kuan Li, Beijing (CN); Zhongli Luo, Beijing (CN); Xingyu Pu, Beijing (CN); Yuansheng Tang, Beijing (CN); Hebing Xu, Beijing (CN); Cheng Zuo, Beijing (CN); Yaokun Zheng, Beijing (CN)

(73) Assignees: Chongqing BOE Optoelectronics Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/023,678

(22) PCT Filed: Apr. 6, 2022

(86) PCT No.: PCT/CN2022/085394
§ 371 (c)(1),
(2) Date: Feb. 27, 2023

(87) PCT Pub. No.: WO2023/193149
PCT Pub. Date: Oct. 12, 2023

(65) Prior Publication Data
US 2025/0022400 A1   Jan. 16, 2025

(51) Int. Cl.
*G09G 3/36* (2006.01)
*G09G 3/20* (2006.01)
*G09G 3/3266* (2016.01)

(52) U.S. Cl.
CPC ......... *G09G 3/2096* (2013.01); *G09G 3/3266* (2013.01); *G09G 3/3677* (2013.01); *G09G 2310/0289* (2013.01); *G09G 2310/08* (2013.01)

(58) Field of Classification Search
CPC .. G09G 3/2096; G09G 3/3266; G09G 3/3677; G09G 2310/0289; G09G 2310/08
See application file for complete search history.

(56) References Cited

U.S. PATENT DOCUMENTS

2012/0313866 A1* 12/2012 Ha .................. G06F 3/0446
345/173
2015/0346887 A1* 12/2015 Cho .................. G06F 3/0446
345/174

(Continued)

*Primary Examiner* — Adam J Snyder
(74) *Attorney, Agent, or Firm* — IPro, PLLC

(57) ABSTRACT

Embodiments of the present disclosure provide a drive apparatus and a display apparatus. The drive apparatus includes: a first controller configured to generate and output a data control synchronization signal after being energized, the data control synchronization signal is configured to control whether to load a data voltage onto a data line in a touch display panel to be connected; and a second controller connected with the first controller, and configured to directly output a first set level signal and a second set level signal before being energized; where the first set level signal is configured to control the selection of a display drive mode from a plurality of drive modes supported by the touch display panel to be connected; and the second set level signal is configured to control the output of a drive signal corresponding to the display drive mode to the touch display panel to be connected.

17 Claims, 6 Drawing Sheets

(56) References Cited

U.S. PATENT DOCUMENTS

| | | | |
|---|---|---|---|
| 2020/0183539 A1* | 6/2020 | Kang | G06F 3/0446 |
| 2021/0191555 A1* | 6/2021 | Jo | G06F 3/044 |
| 2022/0011895 A1* | 1/2022 | Park | G06F 3/04166 |
| 2022/0155935 A1* | 5/2022 | Bin | G06F 3/04166 |
| 2022/0197474 A1* | 6/2022 | Kang | G06F 3/0446 |

* cited by examiner

DRIVE APPARATUS AND DISPLAY APPARATUS

CROSS REFERENCE TO RELATED APPLICATIONS

The present disclosure is a national phase entry under 35 U.S.C. § 371 of International Application No. PCT/CN2022/085394, filed Apr. 6, 2022, and entitled "DRIVE APPARATUS AND DISPLAY APPARATUS".

FIELD

The present disclosure relates to the field of display, in particular to a drive apparatus and a display apparatus.

BACKGROUND

In the general case, a display apparatus is equipped with a display panel and a controller. The display panel usually includes a number of pixel units, each of which can include a red sub-pixel, a green sub-pixel, and a blue sub-pixel. The controller can input corresponding commands to the display panel to control corresponding brightness of each sub-pixel, so as to produce mixed color to be displayed and allow the display panel to display color images accordingly.

SUMMARY

Embodiments of the present disclosure discloses a drive apparatus, including:
a first controller configured to generate and output a data control synchronization signal after being energized, the data control synchronization signal is configured to control whether to load a data voltage onto a data line in a touch display panel to be connected; and
a second controller connected with the first controller, the second controller is configured to directly output a first set level signal and a second set level signal before being energized;
the first set level signal is configured to control the selection of a display drive mode from a plurality of drive modes supported by the touch display panel to be connected; and
the second set level signal is configured to control the output of a drive signal corresponding to the display drive mode for the touch display panel to be connected.

In some embodiments, in the case that a level of the data control synchronization signal is a first level, the data voltage is controlled to be loaded onto the data line in the touch display panel to be connected; and
in the case that a level of the data control synchronization signal is a second level, the data voltage is controlled to be stopped from being loaded onto the data line in the touch display panel to be connected.

In some embodiments, the data control synchronization signal is a clock signal.

In some embodiments, the first controller is further configured to generate and output a clock control synchronization signal after being energized; and
the second controller is further configured to receive the clock control synchronization signal after being energized, and generate and output a mode enablement signal and a drive control synchronization signal according to the clock control synchronization signal; the mode enablement signal is configured to control the selection of a target drive mode from the plurality of drive modes; and the drive control synchronization signal is configured to control the output of a drive signal corresponding to the target drive mode for the touch display panel to be connected.

In some embodiments, the first controller is further configured to generate the data control synchronization signal according to the clock control synchronization signal.

In some embodiments, the first controller is further configured to generate the clock control synchronization signal and the data control synchronization signal simultaneously.

In some embodiments, the data control synchronization signal has the same timing as the clock control synchronization signal.

In some embodiments, the drive control synchronization signal is the clock signal;
duration of a first level in one clock cycle of the clock control synchronization signal is within duration of a first level in one clock cycle of the drive control synchronization signal; and
duration of a second level in one clock cycle of the drive control synchronization signal is within duration of a second level in one clock cycle of the clock control synchronization signal.

In some embodiments, the first controller includes a timing controller and a first conversion resistor;
a first timing pin of the timing controller is coupled with a first end of the first conversion resistor, and a second end of the first conversion resistor is configured to output the data control synchronization signal; and
the timing controller is configured to generate the data control synchronization signal after being energized, and output the data control synchronization signal through the second end of the first conversion resistor.

In some embodiments, the timing controller is further configured to generate the clock control synchronization signal after being energized, and output the clock control synchronization signal through the first timing pin.

In some embodiments, the second controller includes a microprocessor; and,
the microprocessor is configured to directly output the first set level signal through a first processing pin and output the second set level signal through a second processing pin before being energized.

In some embodiments, the microprocessor is further configured to receive the clock control synchronization signal through a third processing pin, generate the mode enablement signal and the drive control synchronization signal according to the clock control synchronization signal, output the mode enablement signal through the first processing pin, and output the drive control synchronization signal through the second processing pin after being energized.

In some embodiments, the drive apparatus further includes a touch and display drive circuit; a first drive pin of the touch and display drive circuit is connected with the first processing pin of the microprocessor in the second controller, and a second drive pin of the touch and display drive circuit is connected with the second processing pin of the microprocessor in the second controller; and
the touch and display drive circuit is configured to store the plurality of drive modes supported by the touch display panel, receive the first set level signal through the first drive pin, receive the second set level signal through the second drive pin, select the display drive mode from the plurality of stored drive modes according to the first set level signal, and output, through a third drive pin, the drive signal corresponding to the display drive mode to the touch display panel to be connected according to the second set level signal.

In some embodiments, the touch and display drive circuit is further configured to receive the mode enablement signal through the first drive pin, receive the drive control synchronization signal through the second drive pin, select the target drive mode from the plurality of stored drive modes according to the mode enablement signal, and output, through the third drive pin, the drive signal corresponding to the target drive mode to the touch display panel to be connected.

In some embodiments, the drive apparatus further includes a level shift circuit, and the level shift circuit is connected with the first controller;
the first controller is further configured to output a scan control enablement signal after being energized; and
the level shift circuit is configured to receive the scan control enablement signal and output a scan clock signal according to the scan control enablement signal;
the scan clock signal is configured to load a gate scan signal onto a gate line in the touch display panel to be connected.

A display apparatus provided by the embodiments of the present disclosure includes:
a touch display panel including a touch electrode, a data line and a source drive circuit connected with the data line; and the drive apparatus described above;
the first controller is connected with the source drive circuit, and the source drive circuit is configured to receive the data control synchronization signal and control whether to load the data voltage onto a connected data line according to the data control synchronization signal; and
the second controller is connected with the touch electrode through a touch and display drive circuit, and the touch electrode is configured to receive the drive signal.

In some embodiments, the touch display panel further includes a gate line and a gate drive circuit connected to the gate line; and
the gate drive circuit is connected with a level shift circuit and is configured to receive a scan control enablement signal and load a gate scan signal onto a connected gate line according to the scan control enablement signal.

DETAILED DESCRIPTION OF THE EMBODIMENTS

Figure 1:
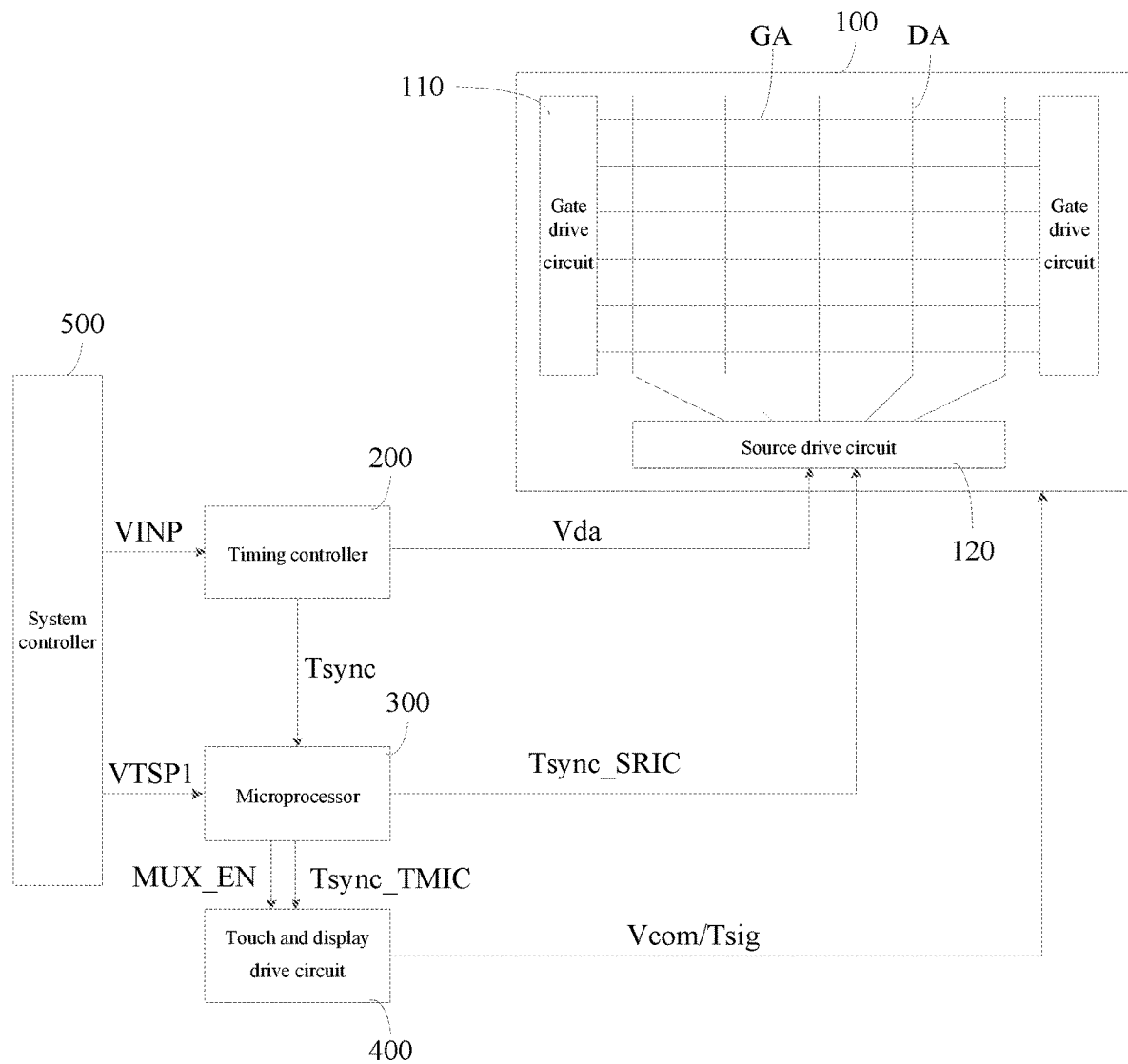
FIG. 1 is a structural schematic diagram of a display apparatus in the related art.

In order to make objectives, technical solutions and advantages of embodiments of the present disclosure clearer, the technical solutions of the embodiments of the present disclosure will be clearly and completely described with reference to accompanying drawings of the embodiments of the present disclosure. Apparently, the described embodiments are some embodiments rather than all embodiments of the present disclosure. In addition, the embodiments in the present disclosure and features in the embodiments can be combined mutually if not conflicted. All other embodiments derived by a person of ordinary skill in the art based on the described embodiments of the present disclosure without creative efforts shall fall within the protection scope of the present disclosure.

Unless otherwise defined, technical terms or scientific terms used in the present disclosure should have ordinary meanings understood by a person of ordinary skill in the art to which the present disclosure belongs. Words such as "first", "second" used in the present disclosure do not denote any order, quantity, or importance, but are merely used to distinguish between different components. Words such as "include" or "encompass" are intended to mean that an element or item in front of the word encompasses elements or items enumerated behind the word and equivalent thereof, but does not exclude other elements or items. Words such as "connection", "connected" are not limited to physical or mechanical connections, but can include an electrical connection in a direct or indirect manner.

It should be noted that a size and a shape of each figure in the accompanying drawings do not reflect true scales, and are merely to illustrate contents of the present disclosure. Throughout the description, identical or similar reference numerals denote identical or similar elements or elements having identical or similar functions.

With reference to FIG. 1, the display apparatus may include a touch display panel 100 and a drive apparatus. The touch display panel 100 may include a plurality of pixel units arranged in an array, a touch electrode, a plurality of gate lines GA, a plurality of data lines DA, a gate drive circuit 110 and a source drive circuit 120. The gate drive circuit 110 is coupled with each of the gate lines GA, and the source drive circuit 120 is coupled with each of the data lines DA. The drive apparatus may further include a timing controller 200, a microprocessor 300, a touch and display drive circuit 400 and a system controller 500. The system controller 500 may input a first power supply voltage VINP into the timing controller 200 to power on the timing controller 200, such that the timing controller 200 may implement a function thereof after being energized. The system controller 500 may further input a second power supply voltage VTSP into the microprocessor 300 to power on the microprocessor 300, such that the microprocessor 300 may implement a function thereof after being energized.

Illustratively, in the case that the touch display panel 100 implements a touch function with self-capacitance technology, the touch electrode may be set to be a self-capacitance electrode. In the case that the touch display panel 100 implements a touch function with mutual capacitance technology, the touch electrode may be set to be a mutual capacitance electrode. In the case that the touch display panel 100 implements a touch function with pressure-sensitive capacitance technology, the touch electrode may be set to be a pressure-sensitive capacitance electrode. It is certain that in an actual application, an implementation mode of the touch electrode may be determined according to requirements of the actual application, and is not limited herein.

Illustratively, the touch display panel 100 may be at least one of a liquid crystal display (LCD) panel and an organic light-emitting diode (OLED) display panel. Illustratively, in the case that the touch display panel 100 is the LCD panel, the touch electrode may be reused as a common electrode. In the case that the touch display panel 100 is an OLED display panel, the touch electrode may be multiplexed as a cathode of an OLED.

Figure 2:
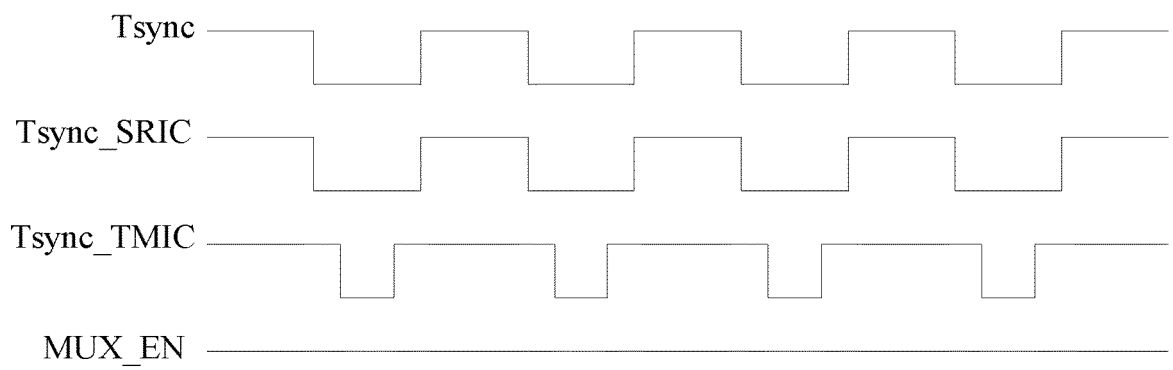
FIG. 2 shows a signal timing diagram in the related art.

Illustratively, as shown in FIGS. 1 and 2, the timing controller 200 may transmit display data Vda to the source drive circuit 120 after being energized (the display data include digital voltage forms of the data voltage having corresponding gray-scale values one-to-one corresponding to sub-pixels in the touch display panel 100), may generate a control synchronization signal Tsync for display and touch timing, and transmit the generated control synchronization signal Tsync to the microprocessor 300. After receiving the control synchronization signal Tsync, the microprocessor 300 generates a signal Tsync_SRIC, a signal Tsync_TMIC and a signal MUX_EN respectively according to the control synchronization signal Tsync. The signal Tsync_SRIC is input into the source drive circuit 120, such that an operation state of the source drive circuit 120 is controlled according to the signal Tsync_SRIC. For example, in the case that the signal Tsync_SRIC is a high level, the source drive circuit 120 may load the data voltage onto the data line according to received display data, to normally output the data voltage for display. In the case that the signal Tsync_SRIC is a low level, the source drive circuit 120 does not operate, and stops output.

Moreover, the signal Tsync_TMIC is input into the touch and display drive circuit 400, such that signal output by the touch and display drive circuit 400 is controlled according to the signal Tsync_TMIC. For example, in the case that the signal Tsync_TMIC is the high level, the touch and display drive circuit 400 outputs a common voltage signal Vcom to the touch electrode for display. In the case that the signal Tsync_TMIC is the low level, the touch and display drive circuit 400 outputs a touch detection signal Tsig to the touch electrode for touch.

Moreover, the signal MUX_EN is input into the touch and display drive circuit 400 to control which drive mode is used by the touch and display drive circuit 400 based on the signal MUX_EN. For example, in the case that the signal MUX_EN is the high level, the touch and display drive circuit 400 may select a display and touch switching drive mode, such that the touch and display drive circuit 400 may implement an operation mode of switching between the display and the touch. In the case that the signal MUX_EN is the low level, the touch and display drive circuit 400 may select a display drive mode, such that the touch and display drive circuit 400 may implement a display-only operation mode.

As shown in FIG. 1 and FIG. 2, in the case that the touch display panel 100 is controlled to implement the display and touch switching drive mode of display and touch switching, the system controller 500 may transmit the first power supply voltage VINP to the timing controller 200 to power on the timing controller 200, so as to energize the timing controller 200. After being energized, the timing controller 200 may generate and output the control synchronization signal Tsync, obtain the display data Vda of a picture to be displayed, and transmit the display data Vda to the source drive circuit 120. Moreover, the system controller 500 may further input the second power supply voltage VTSP into the microprocessor 300 to power on the microprocessor 300, so as to energize the microprocessor 300. After being energized, the microprocessor 300 may receive the control synchronization signal Tsync output by the timing controller 200, and generate the signal Tsync_SRIC in the form of a clock signal, the signal Tsync_TMIC in the form of a clock signal and the signal MUX_EN with a high-level according to a received control synchronization signal Tsync. Moreover, the microprocessor 300 transmits a generated signal Tsync_SRIC to the source drive circuit 120. The source drive circuit 120 loads the data voltage onto the data line according to the display data Vda in the case that the signal Tsync_SRIC is the high level. Moreover, the microprocessor 300 transmits the signal Tsync_TMIC and the signal MUX_EN with the high level to the touch and display drive circuit 400, such that the touch and display drive circuit 400 may select the display and touch switching drive mode according to the signal MUX_EN with the high level, and output the common voltage signal Vcom to the touch electrode according to a high level in the signal Tsync_TMIC. In this way, the touch and display drive circuit 400 may display the picture under interaction of a loaded data voltage and the common voltage signal Vcom. Moreover, in the case that the signal Tsync_TMIC is the low level and the signal Tsync_SRIC is the low level, the source drive circuit 120 stops loading the data voltage onto the data line in the case that the signal Tsync_SRIC is the low level. Moreover, the touch and display drive circuit 400 outputs the touch detection signal Tsig to the touch electrode in the case that the signal Tsync_TMIC is the low level. In this way, the touch and display drive circuit 400 may implement the touch and keep picture display.

Figure 3:
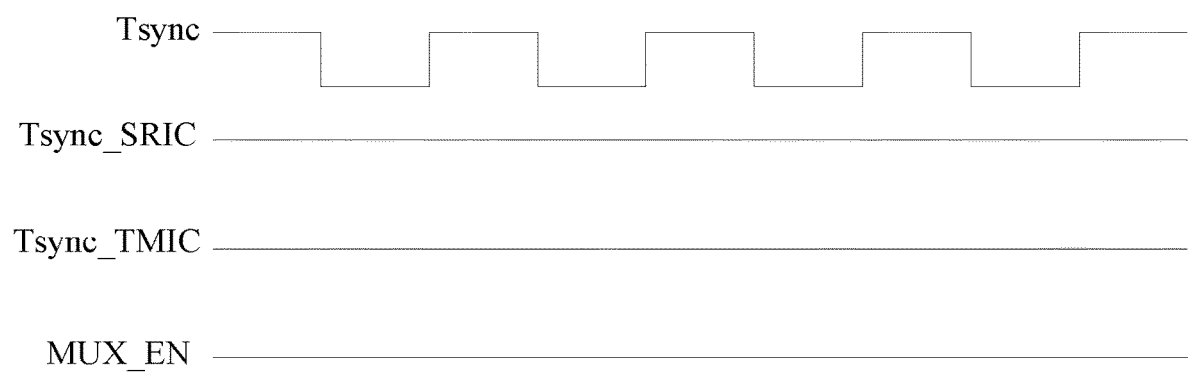
FIG. 3 shows another signal timing diagram in the related art.

As shown in FIGS. 1 and 3, in the case that the touch display panel 100 is controlled to implement the display-only display drive mode, the system controller 510 may load the first power supply voltage VINP onto the timing controller 200 instead of loading the second power supply voltage VTSP onto the microprocessor 300, thus not controlling the touch display panel 100 to implement the touch function. The timing controller 200 is energized due to loading of the first power supply voltage VINP onto the timing controller 200, and then the timing controller 200 may generate and output the control synchronization signal Tsync, obtain the display data Vda of the picture to be displayed, and transmit the display data Vda to the source drive circuit 120. However, since the second power supply voltage VTSP is not loaded onto the microprocessor 300, the microprocessor 300 is not energized, and the microprocessor 300 does not operate, such that a voltage corresponding to the signal Tsync_SRIC input by the microprocessor 300 into the source drive circuit 120 is cause to equal 0 V, that is, the signal Tsync_SRIC is kept the low level. Moreover, a voltage corresponding to the signal Tsync_TMIC input into the touch and display drive circuit 400 is also cause to equal 0 V, that is, the signal Tsync_TMIC is kept the low level. However, due to existence of a pull-up resistor, the signal MUX_EN input into the touch and display drive circuit 400 is kept the high level. However, since the signal Tsync_SRIC is kept the low level, the source drive circuit 120 may not output the data voltage, causing the touch display panel 100 to be blank and not display the picture, that is, the display drive mode may not be implemented.

Figure 4:
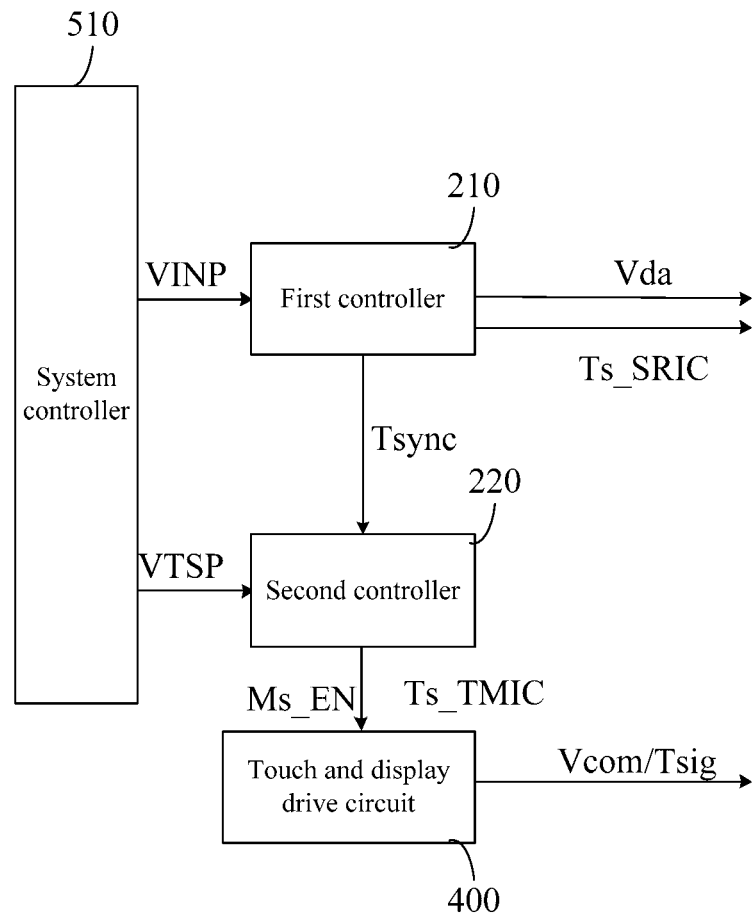
FIG. 4 is a structural schematic diagram of a drive apparatus according to an embodiment of the present disclosure.
Figure 5:
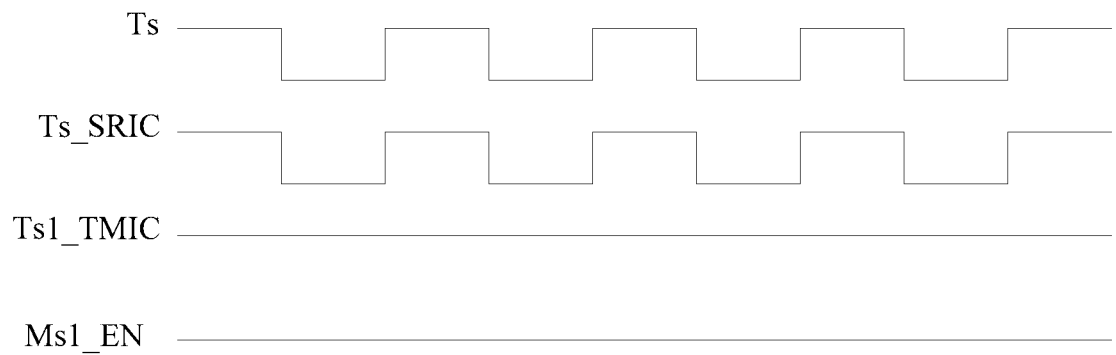
FIG. 5 shows a signal timing diagram according to an embodiment of the present disclosure.

In order to solve the above problems, a drive apparatus provided by the embodiments of the present disclosure, as shown in FIGS. 4 and 5, may include a first controller 210 and a second controller 220. The second controller 220 is connected to the first controller 210. Moreover, the first controller 210 may generate and output a data control synchronization signal Ts_SRIC after being energized. The second controller 220 may directly output a first set level signal Ms1_EN and a second set level signal Ts1_TMIC before being energized. Moreover, the data control synchronization signal Ts_SRIC may control whether to load a data voltage onto a data line in a touch display panel 100 to be connected. Moreover, the first set level signal Ms1_EN may control the selection of a display drive mode from a plurality of drive modes supported by the touch display panel 100 to be connected, and the second set level signal Ts1_TMIC may control the output of a drive signal corresponding to the display drive mode to the touch display panel 100 to be connected.

In the above drive apparatus according to the embodiments of the present disclosure, before being energized, the second controller 220 may directly output the first set level signal Ms1_EN for controlling selection of the display drive mode and directly output the second set level signal Ts1_TMIC for controlling output of the drive signal corresponding to the display drive mode. Moreover, after being energized, the first controller 210 may output the data control synchronization signal Ts_SRIC that controls whether to load the data voltage onto the data line in the touch display panel 100 to be connected. In this way, in the case that the first controller 210 is energized and the second controller 220 is not energized, the touch display panel 100 may be controlled to implement the display function instead of the touch function.

In some embodiments of the present disclosure, in the case that a level of the data control synchronization signal Ts_SRIC is a first level, the data voltage may be controlled to be loaded onto the data line in the touch display panel 100 to be connected. Moreover, in the case that a level of the data control synchronization signal Ts_SRIC is a second level, stop loading the data voltage onto the data line in the touch display panel 100 to be connected. Illustratively, the first level of the data control synchronization signal Ts_SRIC may be the high level, and the second level thereof may be the low level. Alternatively, the first level of the data control synchronization signal Ts_SRIC may be the low level, and the second level thereof may be the high level.

In some embodiments of the present disclosure, the data control synchronization signal Ts_SRIC may be set to be a square wave signal switchable between the high level and the low level. Illustratively, the data control synchronization signal Ts_SRIC may be set to be a clock signal. For example, the data control synchronization signal Ts_SRIC set to be the clock signal may be set to have a frequency of 960 Hz, a duty ratio of 56.7%, and a voltage of 2.5 V corresponding to the high level, and a voltage of 0 V corresponding to the low level. It is certain that in an actual application, a specific implementation mode of the data control synchronization signal Ts_SRIC may be determined according to requirements of the actual application, and is not limited herein.

In some embodiments of the present disclosure, the first controller 210 may further generate and output a clock control synchronization signal Ts after being energized. The second controller 220 may further receive the clock control synchronization signal Ts after being energized, and generate and output a mode enablement signal Ms2_EN and a drive control synchronization signal Ts2_TMIC according to the clock control synchronization signal TS. The mode enablement signal Ms2_EN may control that a target drive mode is selected from the plurality of drive modes. The drive control synchronization signal Ts2_TMIC may control a drive signal corresponding to the target drive mode to be output to the touch display panel 100 to be connected.

In some embodiments of the present disclosure, the clock control synchronization signal Ts may be set to be the square wave signal switchable between the high level and the low level. Illustratively, the clock control synchronization signal Ts may be set to be the clock signal. For example, the clock control synchronization signal Ts set to be the clock signal may be set to have a frequency of 960 Hz, a duty ratio of 56.7%, and a voltage of 2.5 V corresponding to the high level, and a voltage of 0 V corresponding to the low level. It is certain that in an actual application, a specific implementation mode of the clock control synchronization signal Ts may be determined according to requirements of the actual application, and is not limited herein.

In some embodiments of the present disclosure, the first controller 210 may further generate the data control synchronization signal Ts_SRIC according to the clock control synchronization signal Ts. Illustratively, as shown in FIG. 5, the data control synchronization signal Ts_SRIC may use bypass design, such that the data control synchronization signal Ts_SRIC has the exactly same waveform as the clock control synchronization signal Ts, and the data control synchronization signal Ts_SRIC has the same timing as the clock control synchronization signal Ts. For example, the first controller 210 may be further configured to generate the clock control synchronization signal Ts and the data control synchronization signal Ts_SRIC simultaneously. In this way, the first controller 210 may output the clock control synchronization signal Ts and the data control synchronization signal Ts_SRIC with the same waveform, thus reducing difficulty of signal design.

In some embodiments of the present disclosure, the drive control synchronization signal Ts2_TMIC may further be set to be the clock signal. Duration of a first level in one clock cycle of the clock control synchronization signal Ts is within duration of a first level in one clock cycle of the drive control synchronization signal Ts2_TMIC. Duration of a second level in one clock cycle of the drive control synchronization signal Ts2_TMIC is within duration of a second level in one clock cycle of the clock control synchronization signal Ts. Illustratively, as shown in FIG. 5, the first level may be the high level, and the second level may be the low level. Duration of a high level in one clock cycle of the clock control synchronization signal Ts is within duration of a high level in one clock cycle of the drive control synchronization signal Ts2_TMIC. Duration of a low level in one clock cycle of the drive control synchronization signal Ts2_TMIC is within duration of a low level in one clock cycle of the clock control synchronization signal Ts. Alternatively, the first level may be the high level, and the second level may be the high level, then duration of a low level in one clock cycle of the clock control synchronization signal Ts is within duration of a low level in one clock cycle of the drive control synchronization signal Ts2_TMIC; and duration of a high level in one clock cycle of the drive control synchronization signal Ts2_TMIC is within duration of a high level in one clock cycle of the clock control synchronization signal Ts.

Illustratively, the drive control synchronization signal Ts2_TMIC set to be the clock signal may be set to have a frequency of 960 Hz, a duty ratio of 68.4%, and a voltage of 2.5 V corresponding to the high level, and a voltage of 0 V corresponding to the low level. It is certain that in an actual application, a specific implementation mode of the drive control synchronization signal Ts2_TMIC may be determined according to requirements of the actual application, and is not limited herein.

Figure 6:
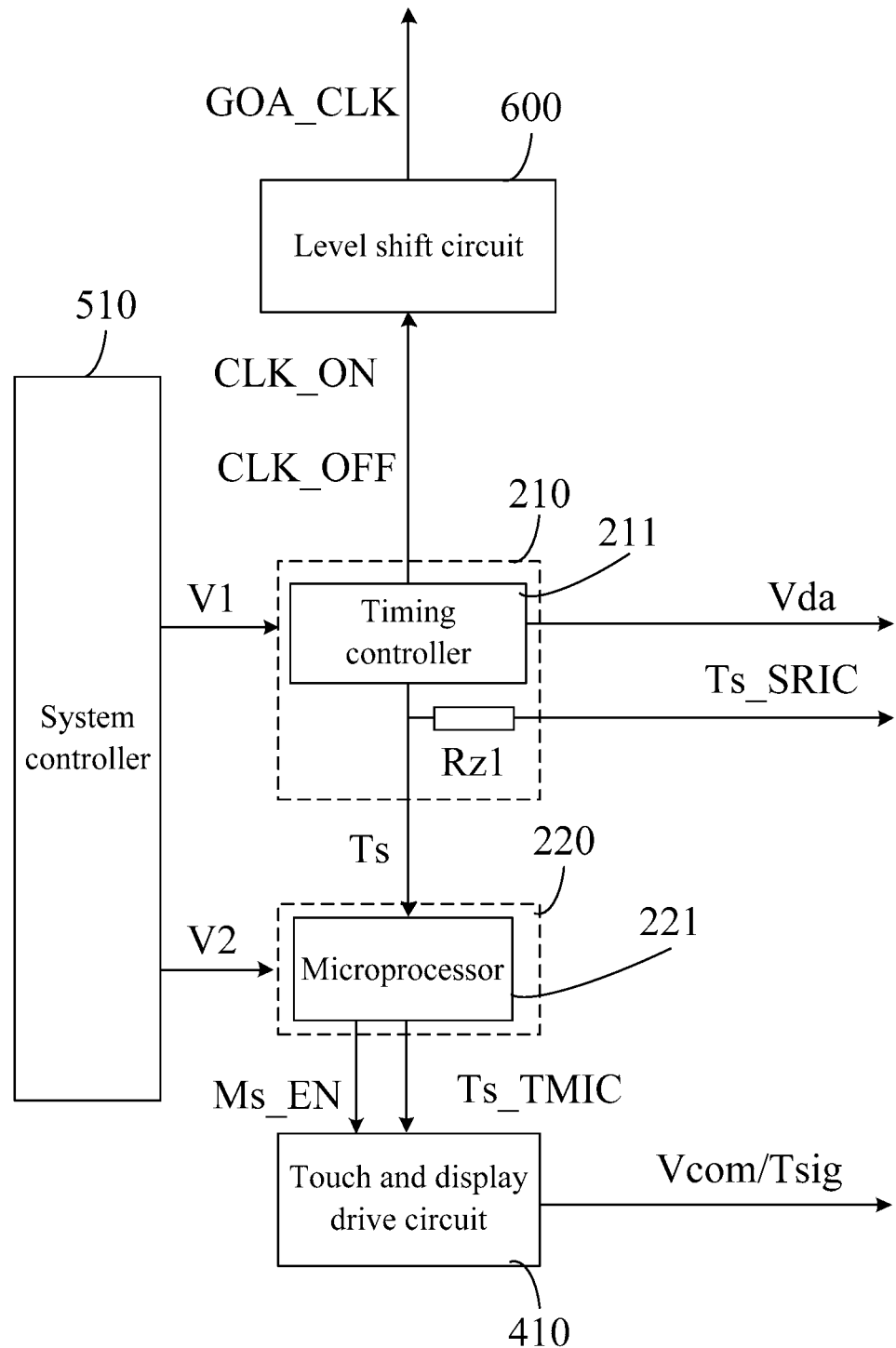
FIG. 6 is another structural schematic diagram of a drive apparatus according to an embodiment of the present disclosure.
Figure 8:
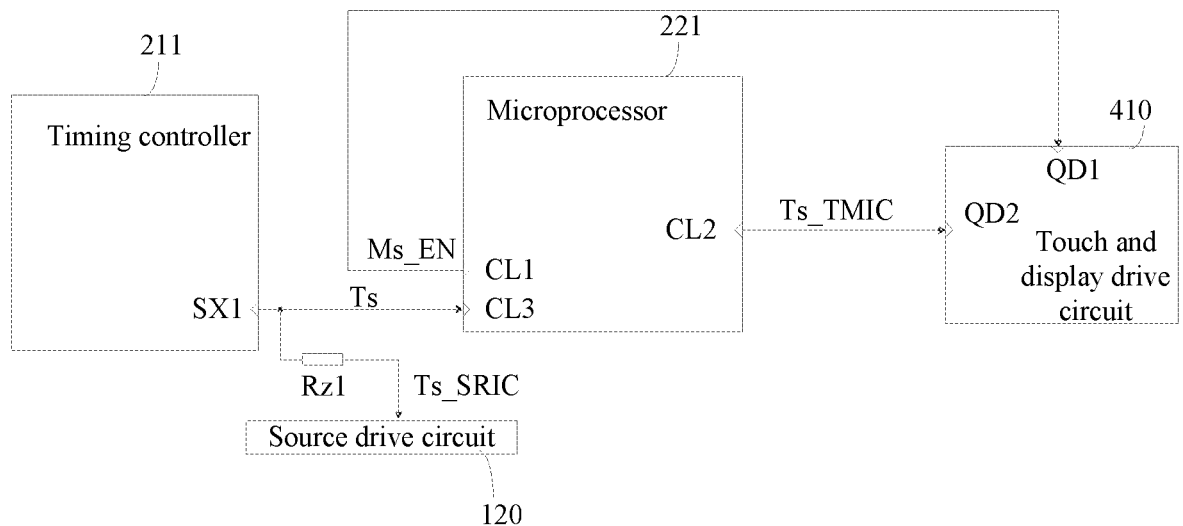
FIG. 8 is another structural schematic diagram of a drive apparatus according to an embodiment of the present disclosure.

In some embodiments of the present disclosure, as shown in FIGS. 6 and 8, the first controller 210 may include: a timing controller 211 and a first conversion resistor Rz1. A first timing pin SX1 of the timing controller 211 is coupled with a first end of the first conversion resistor Rz1, and a second end of the first conversion resistor Rz1 is configured to output the data control synchronization signal Ts_SRIC. Illustratively, the timing controller 211 may generate the data control synchronization signal Ts_SRIC after being energized, and output the data control synchronization signal Ts_SRIC through the second end of the first conversion resistor Rz1. Moreover, the timing controller 211 further generates the clock control synchronization signal Ts after being energized, and output the clock control synchronization signal Ts through the first timing pin SX1. In this way, the data control synchronization signal Ts_SRIC may use bypass design, such that the data control synchronization signal Ts_SRIC has the exactly same waveform as the clock control synchronization signal Ts, and the data control synchronization signal Ts_SRIC has the same timing as the clock control synchronization signal Ts. Moreover, the data control synchronization signal Ts_SRIC may be output by merely adding one first conversion resistor Rz1 to original design of the timing controller 211, and difficulty of design is reduced accordingly.

Illustratively, the first timing pin SX1 may be set to be a pin in a general purpose input output (GPIO) interface. For example, the first timing pin SX1 may be set to be a pin GPIO22 in the GPIO interface in the timing controller 211. It is certain that in an actual application, specific setting may be determined according to requirements of the actual application, and is not limited herein. It should be noted that functions and connection modes of the other pins in the timing controller 211 may be basically the same as those in the related art, and details are not repeated herein.

In some embodiments of the present disclosure, as shown in FIGS. 6 and 8, the second controller 220 may include: a microprocessor 221. The microprocessor 221 may directly output the first set level signal Ms1_EN through a first processing pin CL1 and output the second set level signal Ts1_TMIC through a second processing pin CL2 before being energized. Illustratively, the first set level signal Ms1_EN is directly output through the first processing pin CL1, without being connected to a pull-up resistor. Moreover, since the microprocessor 221 is not energized, the microprocessor 221 may not operate, and the microprocessor 221 may not control the first processing pin CL1 and the second processing pin CL2 to perform pull-up action. Therefore, in the case that the microprocessor 221 is not energized, the first set level signal Ms1_EN output by the first processing pin CL1 and the second set level signal Ts1_TMIC output by the second processing pin CL2 may be each a low level signal.

In some embodiments of the present disclosure, as shown in FIGS. 6 and 8, the microprocessor 221 may further receive the clock control synchronization signal Ts output by the first timing pin SX1 of the timing controller 211 through the third processing pin CL3, generate the mode enablement signal Ms2_EN and the drive control synchronization signal Ts2_TMIC according to the clock control synchronization signal TS, and output the mode enablement signal Ms2_EN through the first processing pin CL1 and the drive control synchronization signal Ts2_TMIC through the second processing pin CL2 after being energized. That is, after the microprocessor 221 is energized, the microprocessor 221 may perform corresponding processing operation, and may generate the mode enablement signal Ms2_EN and the drive control synchronization signal Ts2_TMIC according to the clock control synchronization signal TS.

Illustratively, the first processing pin CL1, the second processing pin CL2 and the third processing pin CL3 each may be set to be a pin in the GPIO interface. For example, the first processing pin CL1 may be set to be a pin GPIOA26 in the GPIO interface in the microprocessor 221. The second processing pin CL2 may be set to be a pin GPIOA40 in the GPIO interface in the microprocessor 221. The third processing pin CL3 may be set to be a pin GPIOA35 in the GPIO interface in the microprocessor 221. It is certain that in an actual application, specific setting may be determined according to requirements of the actual application, and is not limited herein. It should be noted that functions and connection modes of the other pins in the microprocessor 221 may be basically the same as those in the related art, and details are not repeated herein.

In some embodiments of the present disclosure, as shown in FIGS. 6 and 8, the drive apparatus may further includes a touch and display drive circuit 410; a first drive pin QD1 of the touch and display drive circuit 410 is connected to the first processing pin CL1 of the microprocessor 221 in the second controller 220, and a second drive pin QD2 of the touch and display drive circuit 410 is connected to the second processing pin CL2 of the microprocessor 221 in the second controller 220. Moreover, the touch and display drive circuit 410 may store the plurality of drive modes supported by the touch display panel 100, receive, before the microprocessor 221 is energized, the first set level signal Ms1_EN through the first drive pin QD1, receive the second set level signal Ts1_TMIC through the second drive pin QD2, select the display drive mode from a plurality of stored drive modes according to the first set level signal Ms1_EN, and output, through the third drive pin, the drive signal corresponding to the display drive mode to the touch display panel 100 to be connected according to the second set level signal Ts1_TMIC.

Further, after the microprocessor 221 is energized, the touch and display drive circuit 410 may receive the mode enablement signal Ms2_EN through the first drive pin QD1 and receive the drive control synchronization signal Ts2_TMIC through the second drive pin QD2, select the target drive mode from the plurality of stored drive modes according to the mode enablement signal Ms2_EN, and output, through the third drive pin, the drive signal corresponding to the target drive mode to the touch display panel 100 to be connected according to the drive control synchronization signal Ts2_TMIC.

Illustratively, the first drive pin QD1 and the second drive pin QD2 may be each set to be a pin in the GPIO interface. For example, the first drive pin QD1 and the second drive pin QD2 may be set to be pins in a GPIO interface in the touch and display drive circuit. It is certain that in an actual application, specific setting may be determined according to requirements of the actual application, and is not limited herein. It should be noted that functions and connection modes of the other pins in the touch and display drive circuit may be basically the same as those in the related art, and details are not repeated herein.

Illustratively, the plurality of drive modes supported by the touch display panel 100 stored in the touch and display drive circuit 410 may include a display and touch switching drive mode that may control the touch display panel 100 to implement display and touch, a display drive mode that may merely control the touch display panel 100 to implement the display, and a touch drive mode that may merely control the touch display panel 100 to implement the touch. Illustratively, the target drive mode may be the display and touch switching drive mode that controls the touch display panel 100 to implement the display and the touch. Optionally, the target drive mode may be the display drive mode that merely controls the touch display panel 100 to implement the display. Optionally, the target drive mode may be the touch drive mode that merely controls the touch display panel 100 to implement the touch. It is certain that in the actual application, specific modes of the drive mode and the target drive mode stored in the touch and display drive circuit may further be determined according to the requirements of the actual application, and are not limited herein.

In some embodiments of the present disclosure, as shown in FIG. 6, the drive apparatus may further include: a level shift circuit 600, and the level shift circuit 600 is connected to the timing controller 211 in the first controller 210. The first controller 210 may further output scan control enablement signals CLK_ON and CLK_OFF after being energized. The level shift circuit 600 may receive the scan control enablement signals CLK_ON and CLK_OFF and output a scan clock signal GOA_CLK according to the scan control enablement signals CLK_ON and CLK_OFF. The scan clock signal GOA_CLK may be configured to load a gate scan signal onto a gate line in the touch display panel 100 to be connected.

In some embodiments of the present disclosure, as shown in FIGS. 4 and 6, the drive apparatus may further include a system controller 510. The system controller 510 may provide a first voltage V1 for the timing controller 211 in the first controller 210 to energize the timing controller 211. The system controller 510 may provide a voltage V2 for the microprocessor 221 in the second controller 220, so as to energize the microprocessor 221. Illustratively, the system controller 510 may provide a voltage V2 for the microprocessor 221 in the second controller 220 while providing the first voltage V1 for the timing controller 211 in the first controller 210. Alternatively, the system controller 510 may not provide the voltage V2 for the microprocessor 221 in the second controller 220 while providing the first voltage V1 for the timing controller 211 in the first controller 210.

In some embodiments of the present disclosure, the system controller 510 may include a system on chip (SOC). The touch and display drive circuit may include a display driver integrated circuit (IC) chip.

In some embodiments of the present disclosure, at least two of the system controller 510, the first controller 210, the second controller 220, the touch and display drive circuit 410, and the level shift circuit 600 may be arranged on the same circuit board. In this way, integration may be improved. Illustratively, the system controller 510, the first controller 210, the second controller 220, the touch and display drive circuit 410, and the level shift circuit 600 may be arranged on the same circuit board. In this way, integration may be improved as much as possible. It is certain that the system controller 510, the first controller 210, the second controller 220, the touch and display drive circuit 410, and the level shift circuit 600 may further be arranged on different circuit boards separately. In the actual application, specific setting may be determined according to the requirements of the actual application, and is not limited herein.

Figure 9:
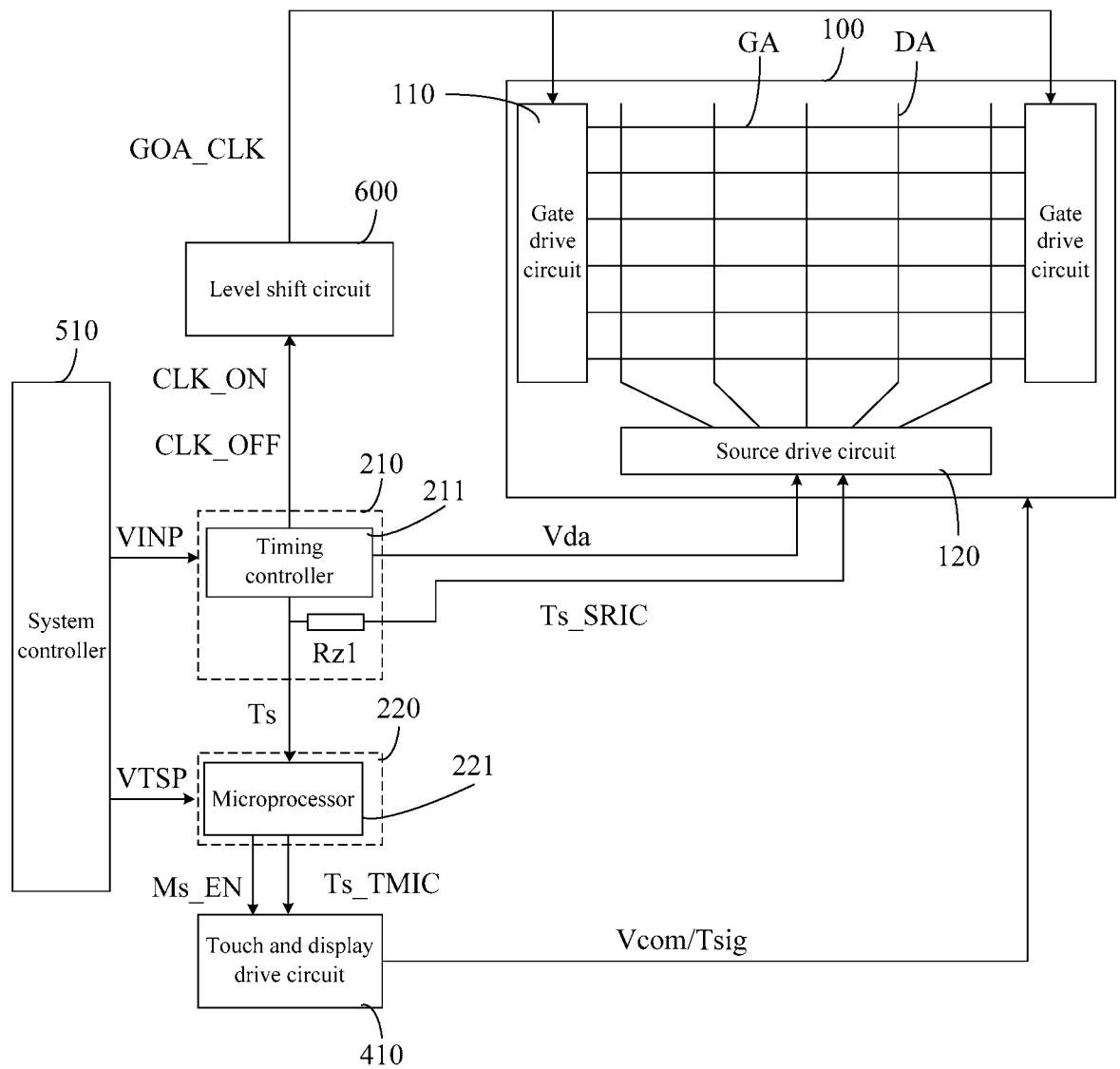
FIG. 9 is a structural schematic diagram of a display apparatus according to an embodiment of the present disclosure.

The embodiments of the present disclosure further provide a display apparatus. As shown in FIG. 9, the display apparatus may include a touch display panel 100 and a drive apparatus. The touch display panel 100 may have basically the same structure as in FIG. 1, and the drive apparatus may have basically the same structure as in FIGS. 4 to 8, so details are not repeated herein.

Illustratively, as shown in FIG. 9, a timing controller 211 in a first controller 210 may be connected with a source drive circuit 120. The source drive circuit 120 may receive a data control synchronization signal Ts_SRIC, and control whether to load a data voltage onto a connected data line according to the data control synchronization signal Ts_SRIC. Illustratively, in the case that a level of the data control synchronization signal Ts_SRIC is a first level, the source drive circuit 120 may be controlled to operate, so as to load the data voltage onto the data line DA in the touch display panel 100 to be connected. Moreover, in the case that a level of the data control synchronization signal Ts_SRIC is a second level, the source drive circuit 120 may be controlled to stop operating, so as to stop loading the data voltage onto the data line DA in the touch display panel 100 to be connected.

Illustratively, as shown in FIG. 9, a second controller 220 is connected with a touch electrode through a touch and display drive circuit 410, and the touch electrode may receive a drive signal. Illustratively, in the case that a display drive mode is selected, the drive signal received by the touch electrode may be a common voltage signal Vcom, such that the touch display panel 100 may merely implement a display function. In the case that a display and touch switching drive mode is selected, the drive signal received by the touch electrode may be alternately the common voltage signal Vcom and a touch detection signal Tsig, such that the touch display panel 100 may implement display and touch functions.

Illustratively, as shown in FIG. 9, a gate drive circuit 110 may be connected with a level shift circuit 600. Moreover, the gate drive circuit 110 may receive scan control enablement signals CLK_ON and CLK_OFF, and load a gate scan signal onto a connected gate line GA according to the scan control enablement signals CLK_ON and CLK_OFF. Illustratively, the gate drive circuit 110 may load the gate scan signal to the connected gate lines line by line to drive the gate lines line by line, such that the data voltage is input into sub-pixels line by line. Alternatively, the gate drive circuit 110 may further load the gate scan signal onto the connected gate lines every two lines to drive the gate lines every two lines, such that the data voltage is input into the sub-pixels every two lines.

Figure 7:
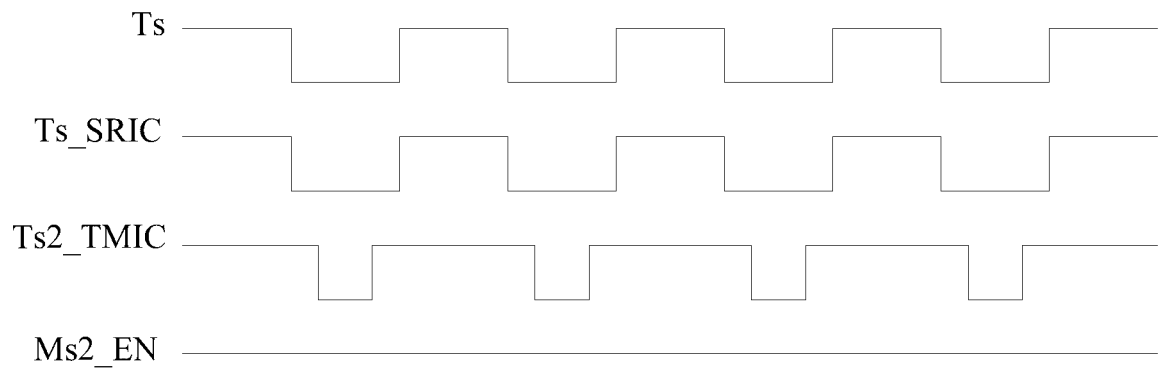
FIG. 7 shows another signal timing diagram according to an embodiment of the present disclosure.

With reference to FIGS. 5, 7 and 9, an operation process of the display apparatus according to the embodiments of the present disclosure will be described below.

In the case that the touch display panel 100 is controlled to implement the display-only display drive mode, the system controller 510 may provide the voltage V1 for the timing controller 211 in the first controller 210 to energize the timing controller 211. Moreover, in the case that the microprocessor 221 in the second controller 220 is not provided with the voltage V2, the microprocessor 221 is not energized. After being energized, the timing controller 211 in the first controller 210 may obtain the display data of the picture to be displayed, generate the clock control synchronization signal Ts, output the generated clock control synchronization signal Ts through the first timing pin, and convert the clock control synchronization signal Ts output by the first timing pin SX1 into the data control synchronization signal Ts_SRIC through the first conversion resistor Rz1. The clock control synchronization signal Ts may be input into the microprocessor 221 in the second controller 220 that is not energized, but the microprocessor 221 in the second controller 220 is not energized and does not operate, so the first processing pin CL1 of the microprocessor 221 in the second controller 220 directly outputs the first set level signal Ms1_EN with the low level, and the second processing pin CL2 outputs the second set level signal Ts1_TMIC with the low level. The timing controller 211 of the first controller 210 may transmit the obtained display data of the picture to be displayed to the source drive circuit 120, and the timing controller 211 of the first controller 210 may further transmit the data control synchronization signal Ts_SRIC output through the first conversion resistor Rz1 to the source drive circuit 120. In this way, in the case that the data control synchronization signal Ts_SRIC is the high level, the source drive circuit 120 may be controlled to operate to load the data voltage onto the connected data line according to the received display data. In the case the data control synchronization signal Ts_SRIC is the low level, the source drive circuit may be controlled to stop operating and stop outputting the data voltage. The first set level signal Ms1_EN with the low level and the second set level signal Ts1_TMIC with the low level may be input into the touch and display drive circuit respectively, the first set level signal Ms1_EN with the low level may select the display drive mode, and the second set level signal Ts1_TMIC with the low level may control the touch and display drive circuit 410 to output the common voltage signal Vcom to the touch electrode. In this way, the sub-pixel may implement the display of the picture under joint control of the data voltage and the common voltage signal Vcom.

In the case that the touch display panel 100 is controlled to implement the display and touch switching drive mode of display and touch switching, the system controller 510 may provide the voltage V1 for the timing controller 211 in the first controller 210 to energize the timing controller 211, and provide the voltage V2 for the microprocessor 221 in the second controller 220 to energize the microprocessor 221. After being energized, the timing controller 211 in the first controller 210 may obtain the display data of the picture to be displayed, generate the clock control synchronization signal Ts, output the generated clock control synchronization signal Ts through the first timing pin, and convert the clock control synchronization signal Ts output by the first timing pin SX1 into the data control synchronization signal Ts_SRIC through the first conversion resistor Rz1. The clock control synchronization signal Ts may be input into the microprocessor 221 in the second controller 220 that is energized, and the microprocessor 221 in the second controller 220 may pull up the first processing pin CL1 according to the clock control synchronization signal Ts, such that the first processing pin CL1 outputs the mode enablement signal Ms2_EN of the high level. Moreover, the microprocessor 221 in the second controller 220 may generate the drive control synchronization signal Ts2_TMIC of the clock signal mode according to the clock control synchronization signal Ts, and output the drive control synchronization signal Ts2_TMIC through the second processing pin CL2. The mode enablement signal Ms2_EN and the drive control synchronization signal Ts2_TMIC are input into the touch and display drive circuit 410 respectively, the display and touch switching drive mode may be selected under the control of the mode enablement signal Ms2_EN with the high level.

Moreover, the timing controller 211 in the first controller 210 may transmit the obtained display data of the picture to be displayed to the source drive circuit 120, and the timing controller 211 in the first controller 210 may further transmit the data control synchronization signal Ts_SRIC output through the first conversion resistor Rz1 to the source drive circuit 120. In this way, in the case that the data control synchronization signal Ts_SRIC is the high level, the source drive circuit 120 may be controlled to operate to load the data voltage onto the connected data line according to the received display data. In this case, the drive control synchronization signal Ts2_TMIC is the high level, and the touch and display drive circuit 410 may be controlled to output the common voltage signal Vcom to the touch electrode. In this way, the sub-pixel may implement the picture display function under joint control of the data voltage and the common voltage signal Vcom.

Moreover, in the case that the data control synchronization signal Ts_SRIC is the low level, the source drive circuit 120 may be controlled to stop operating and stop outputting the data voltage. In this case, the drive control synchronization signal Ts2_TMIC is the low level, the touch and display drive circuit 410 may be controlled to output the touch detection signal Tsig to the touch electrode. In this way, the touch and display drive circuit 410 may implement the touch and keep picture display.

It should be noted that a process of the operation of the touch display panel 100 in the display drive mode may be a display testing process after the touch display panel 100 and the drive apparatus are assembled before delivery, or may further be a process of merely controlling the touch display panel 100 to implement the display function instead of the touch in order to reduce power consumption after delivery.

A person of ordinary skill in the art shall understand that the embodiments of the present disclosure may be provided in the form of a method, a system, or a computer program product. Therefore, the present disclosure may take the form of a full hardware embodiment, a full software embodiment, or an embodiment combining software and hardware. Moreover, the present disclosure may take the form of a computer program product implemented on one or more computer usable storage media (including but not limited to a disk memory, a CD-ROM, an optical memory, etc.) encompassing computer usable program codes.

The present disclosure is described with reference to the flowcharts and/or block diagrams of the method, the device (system), and the computer program product according to the embodiments of the present disclosure. It should be understood that each flow and/or block in the flowchart and/or block diagram and a combination of the flow and/or block in the flowchart and/or block diagram may be implemented by computer program instructions. These computer program instructions may be provided for a processor of a general-purpose computer, a special-purpose computer, an embedded processing machine, or other programmable data processing device to produce a machine, such that instructions executed by the processor of the computer or other programmable data processing device generate an apparatus used for implementing a function specified in one or more flows of the flowchart and/or one or more blocks of the block diagram.

These computer program instructions may also be stored in a computer readable memory that may guide the computer or other programmable data processing device to operate in a specific mode, such that the instructions stored in the computer readable memory produce an article of manufacture including an instruction apparatus, and the instruction apparatus implements the function specified in one or more flows of the flowchart and/or one or more blocks in the block diagram.

These computer program instructions may further be loaded onto the computer or other programmable data processing device, such that a series of operation steps are executed on the computer or other programmable device to generate computer-implemented processing, and the instructions executed on the computer or other programmable device provide steps for implementing the functions specified in the one or more flows of the flowchart and/or one or more blocks in the block diagram.

Although the preferred embodiments of the present disclosure have been described, additional alterations and modifications can be made to those embodiments by those skilled in the art once the basic inventive concept are learned. Therefore, the appended claims will be interpreted to include the preferred embodiments and all alterations and modifications that fall within the scope of the present disclosure.

Apparently, a person of ordinary skill in the art can make various modifications and variations of the embodiments of the present disclosure without departing from the spirit and scope of the embodiments of the present disclosure. In this way, if these modifications and variations of the embodiments of the present disclosure fall within the scope of the claims of the present disclosure and their equivalent technologies, the present disclosure is also intended to encompass these modifications and variations.

What is claimed is:

1. A drive apparatus, comprising:
   a first controller configured to generate and output a data control synchronization signal after being energized, wherein the data control synchronization signal is configured to control whether to load a data voltage onto a data line in a touch display panel to be connected; and
   a second controller connected with the first controller, and the second controller is configured to directly output a first set level signal and a second set level signal before being energized;
   wherein the first set level signal is configured to control a selection of a display drive mode from a plurality of drive modes supported by the touch display panel to be connected; and
   the second set level signal is configured to control a output of a drive signal corresponding to the display drive mode for the touch display panel to be connected.

2. The drive apparatus according to claim 1, wherein in the case that a level of the data control synchronization signal is a first level, the data voltage is controlled to be loaded onto the data line in the touch display panel to be connected; and
   in the case that a level of the data control synchronization signal is a second level, the data voltage is controlled to be stopped from being loaded onto the data line in the touch display panel to be connected.

3. The drive apparatus according to claim 2, wherein the data control synchronization signal is a clock signal.

4. The drive apparatus according to claim 1, wherein the first controller is further configured to generate and output a clock control synchronization signal after being energized; and
   the second controller is further configured to receive the clock control synchronization signal after being energized, and generate and output a mode enablement signal and a drive control synchronization signal according to the clock control synchronization signal;
   wherein the mode enablement signal is configured to control a selection of a target drive mode from the plurality of drive modes; and
   the drive control synchronization signal is configured to control a output of a drive signal corresponding to the target drive mode for the touch display panel to be connected.

5. The drive apparatus according to claim 4, wherein the first controller is further configured to generate the data control synchronization signal according to the clock control synchronization signal.

6. The drive apparatus according to claim 4, wherein the first controller is further configured to generate the clock control synchronization signal and the data control synchronization signal simultaneously.

7. The drive apparatus according to claim 4, wherein the data control synchronization signal has a same timing as the clock control synchronization signal.

8. The drive apparatus according to claim 4, wherein the drive control synchronization signal is the clock signal;
   duration of a first level in one clock cycle of the clock control synchronization signal is within duration of a first level in one clock cycle of the drive control synchronization signal; and
   duration of a second level in one clock cycle of the drive control synchronization signal is within duration of a second level in one clock cycle of the clock control synchronization signal.

9. The drive apparatus according to claim 1, wherein the first controller comprises a timing controller and a first conversion resistor;
   a first timing pin of the timing controller is coupled with a first end of the first conversion resistor, and a second end of the first conversion resistor is configured to output the data control synchronization signal; and
   the timing controller is configured to generate the data control synchronization signal after being energized, and output the data control synchronization signal through the second end of the first conversion resistor.

10. The drive apparatus according to claim 9, wherein the timing controller is further configured to generate the clock control synchronization signal after being energized, and output the clock control synchronization signal through the first timing pin.

11. The drive apparatus according to claim 1, wherein the second controller comprises a microprocessor; and
    the microprocessor is configured to directly output the first set level signal through a first processing pin and output the second set level signal through a second processing pin before being energized.

12. The drive apparatus according to claim 11, wherein the microprocessor is further configured to receive the clock control synchronization signal through a third processing pin, generate the mode enablement signal and the drive control synchronization signal according to the clock control synchronization signal, output the mode enablement signal through the first processing pin, and output the drive control synchronization signal through the second processing pin after being energized.

13. The drive apparatus according to claim 1, wherein the drive apparatus further comprises a touch and display drive circuit; a first drive pin of the touch and display drive circuit is connected with the first processing pin of the microprocessor in the second controller, and a second drive pin of the touch and display drive circuit is connected with the second processing pin of the microprocessor in the second controller; and
    the touch and display drive circuit is configured to store the plurality of drive modes supported by the touch display panel, receive the first set level signal through the first drive pin, receive the second set level signal through the second drive pin, select the display drive mode from the plurality of stored drive modes according to the first set level signal, and output, through a third drive pin, the drive signal corresponding to the display drive mode to the touch display panel to be connected according to the second set level signal.

14. The drive apparatus according to claim 13, wherein the touch and display drive circuit is further configured to receive the mode enablement signal through the first drive pin, receive the drive control synchronization signal through the second drive pin, select the target drive mode from the plurality of stored drive modes according to the mode enablement signal, and output, through the third drive pin, the drive signal corresponding to the target drive mode to the touch display panel to be connected according to the drive control synchronization signal.

15. The drive apparatus according to claim 1, wherein the drive apparatus further comprises a level shift circuit, and the level shift circuit is connected with the first controller;
the first controller is further configured to output a scan control enablement signal after being energized; and
the level shift circuit is configured to receive the scan control enablement signal and output a scan clock signal according to the scan control enablement signal;
wherein the scan clock signal is configured to load a gate scan signal onto a gate line in the touch display panel to be connected.

16. A display apparatus, comprising:
a touch display panel comprising a touch electrode, a data line and a source drive circuit connected with the data line; and
the drive apparatus according to claim 1; wherein
the first controller is connected with the source drive circuit, and the source drive circuit is configured to receive the data control synchronization signal and control whether to load the data voltage onto a connected data line according to the data control synchronization signal; and
the second controller is connected with the touch electrode through a touch and display drive circuit, and the touch electrode is configured to receive the drive signal.

17. The display apparatus according to claim 16, wherein the touch display panel further comprises a gate line and a gate drive circuit connected with the gate line; and
the gate drive circuit is connected with a level shift circuit and is configured to receive a scan control enablement signal and load a gate scan signal onto a connected gate line according to the scan control enablement signal.

* * * * *